(12) United States Patent
Harrar et al.

(10) Patent No.: US 8,839,319 B2
(45) Date of Patent: Sep. 16, 2014

(54) LIMITING RECORDING DEMANDS

(75) Inventors: Derek T. Harrar, Rydal, PA (US);
Roger J. Godin, Berkeley, CA (US);
Robin L. Opie, Newtown Square, PA (US); Robert Gaydos, Harleysville, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 914 days.

(21) Appl. No.: 11/646,705

(22) Filed: Dec. 28, 2006

(65) Prior Publication Data

US 2008/0159714 A1    Jul. 3, 2008

(51) Int. Cl.
| | |
|---|---|
| H04N 7/08 | (2006.01) |
| H04N 21/45 | (2011.01) |
| H04N 21/462 | (2011.01) |
| H04N 5/782 | (2006.01) |
| H04N 21/4335 | (2011.01) |
| H04N 21/433 | (2011.01) |

(52) U.S. Cl.
CPC .......... *H04N 5/782* (2013.01); *H04N 21/4508* (2013.01); *H04N 21/4622* (2013.01); *H04N 21/4335* (2013.01); *H04N 21/4334* (2013.01)
USPC .................. 725/92; 725/55; 725/91; 725/115

(58) Field of Classification Search
CPC . H04N 21/63; H04N 21/632; H04N 21/4583; H04N 21/47202; H04N 21/4334
USPC ............... 725/2, 4, 88, 89, 92, 102, 115, 142, 725/145, 58, 91, 114, 131, 134, 139, 725/74–85; 709/213–219; 386/124, E5.001
See application file for complete search history.

(56) References Cited

U.S. PATENT DOCUMENTS

| | | | | |
|---|---|---|---|---|
| 6,760,918 | B2* | 7/2004 | Rodriguez et al. | 725/134 |
| 7,765,235 | B2* | 7/2010 | Day et al. | 707/795 |
| 2002/0174430 | A1* | 11/2002 | Ellis et al. | 725/46 |
| 2003/0086023 | A1* | 5/2003 | Chung et al. | 725/142 |
| 2003/0149988 | A1* | 8/2003 | Ellis et al. | 725/87 |
| 2003/0237097 | A1* | 12/2003 | Marshall et al. | 725/105 |
| 2004/0060076 | A1* | 3/2004 | Song | 725/145 |
| 2005/0120386 | A1* | 6/2005 | Stone | 725/134 |
| 2007/0157266 | A1* | 7/2007 | Ellis et al. | 725/89 |
| 2008/0022332 | A1* | 1/2008 | Barrett | 725/89 |
| 2008/0104202 | A1* | 5/2008 | Barrett et al. | 709/219 |

* cited by examiner

*Primary Examiner* — Hunter B Lonsberry
*Assistant Examiner* — Patrick A Ryan
(74) *Attorney, Agent, or Firm* — Banner & Witcoff, Ltd.

(57) ABSTRACT

A method and system of limiting recording demands on digital video recorders and other media records. The limiting being facilitated through analysis of programs and other media available from one or more network resources associated with and/or having capabilities to provide media to the recording element. The network resources may be associated with provider resources, customer resources, and/or any other resource in communication with the recording element.

19 Claims, 2 Drawing Sheets

LIMITING RECORDING DEMANDS

BACKGROUND OF THE INVENTION

1. Field of the Invention

The present invention relates to limiting recording demands, such as but not limited to limiting recording demands on digital video recorders (DVRs) and other recording elements having capabilities to execute network communications.

2. Background Art

Digital video recorders (DVRs) and other media recording elements typically include a memory, hard drive, tape, or other element to electronically store electronic media, such as but not limited to programs, movies, audio, video, etc. The memory elements are typically limited as to an amount of media that can be stored. Once the memory becomes full or close to full, the recording element may be unable to record new material and/or may be forced to delete previously recorded media in favor of the new recordings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
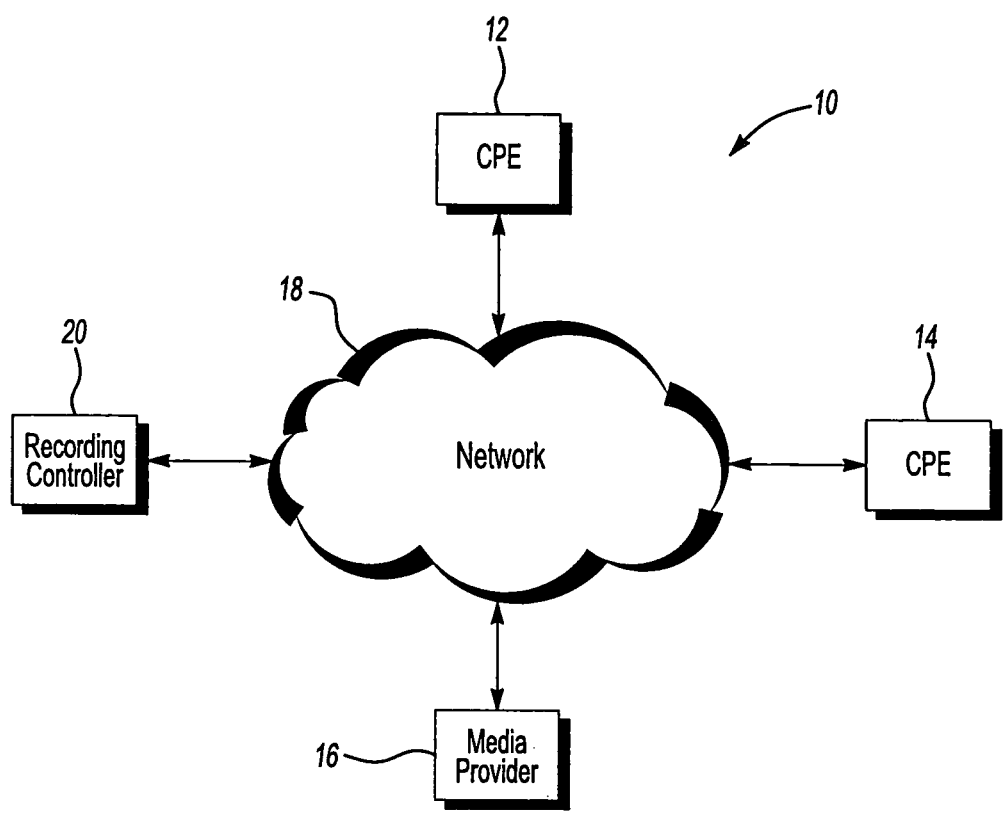
FIG. 1 illustrates a system in accordance with one non-limiting aspect of the present invention.

FIG. 1 illustrates a system 10 in accordance with one non-limiting aspect of the present invention. The system 10 may include a number of pieces of customer premises equipment (CPE) 12-14, a media provider 16, a network 18, and a recording controller 20. The system 10 may be generally referred to as a media content distribution network wherein media content is electronically transferred over the network 18 to the CPE 12-14.

The media provider 16, for exemplary purposes, is most prominently described with respect to being a cable television service provider having capabilities for providing cable television, telecommunications, and/or high-speed data services to the subscriber locations, primarily through wireline and/or wireless communications. The present invention, however, is not so limited and fully contemplates the provider 16 being associated with any type of service provider, including other television providers (IP, broadcast, satellite, etc.) and non-television providers, such as those associated with high-speed data, telecommunications, cellular communications, and the like.

The media provider 16 may be configured to support and/or facilitate the use of any number of television and non-television services and applications, such as, but not limited to email services, data transmission service, linear and non-linear television programming/signaling (cable, satellite, broadcast, etc.), Video on Demand (VOD), interactive television (iTV), interactive gaming, pay-per-view (PPV), digital video recording (local and remote), and/or broadcasting of signals associated with supporting television programming, movies, audio, and other multimedia, as well as, downloading of clips or full-length versions of the same.

The network 18 may include any number of features and devices to facilitate signal transportation and other operations associated with interfacing the subscriber locations with each other and otherwise supporting communications associated with services of the media provider 16. The network 18 may include terrestrial and extraterrestrial components and infrastructures, including cable lines, telephone lines, and/or satellite or other wireless architectures. The network may be associated with other private and/or public networks, such as the Internet and dedicated or virtual private networks.

The CPE 12-14 may relate to any device, element, and other feature associated with interfacing users with various services associated with the media provider, such as but not limited to a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), personal media device, and any other item having capabilities to supporting access to any number of the services.

The CPE 12-14 may be configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

Media may be associated with and/or controlled by the media provider 16 (which in turn may receive the content from other sources). The media may be sourced from the media provider directly, from one or more of the subscriber devices 12-14 connected to the network 18, such as but not limited to peer-to-peer environments, and/or from any other source in communication with the network 18 (internet, etc.). For example, if the media provider 16 is a television service provider, a portion of the media content may relate to television programs, movies, and other multimedia packets. The media content may be delivered to the subscriber locations directly from the media service provider 16 and/or from one or more of the other CPEs 12-14 in communication with the network 18.

The recording controller 20 may be configured to coordinate or otherwise facilitate the recording of media content by the CPE 12-14. It may include memories, processors, communication features, and the like to facilitate communication with the media provider and/or CPE 12-14 and to instruct the operation thereof, as described below in more detail. The recording controller 20 is shown as a standalone item, however, it may be included with the content provider 16, CPE 12-14, and/or other features associated with the network.

Figure 2:
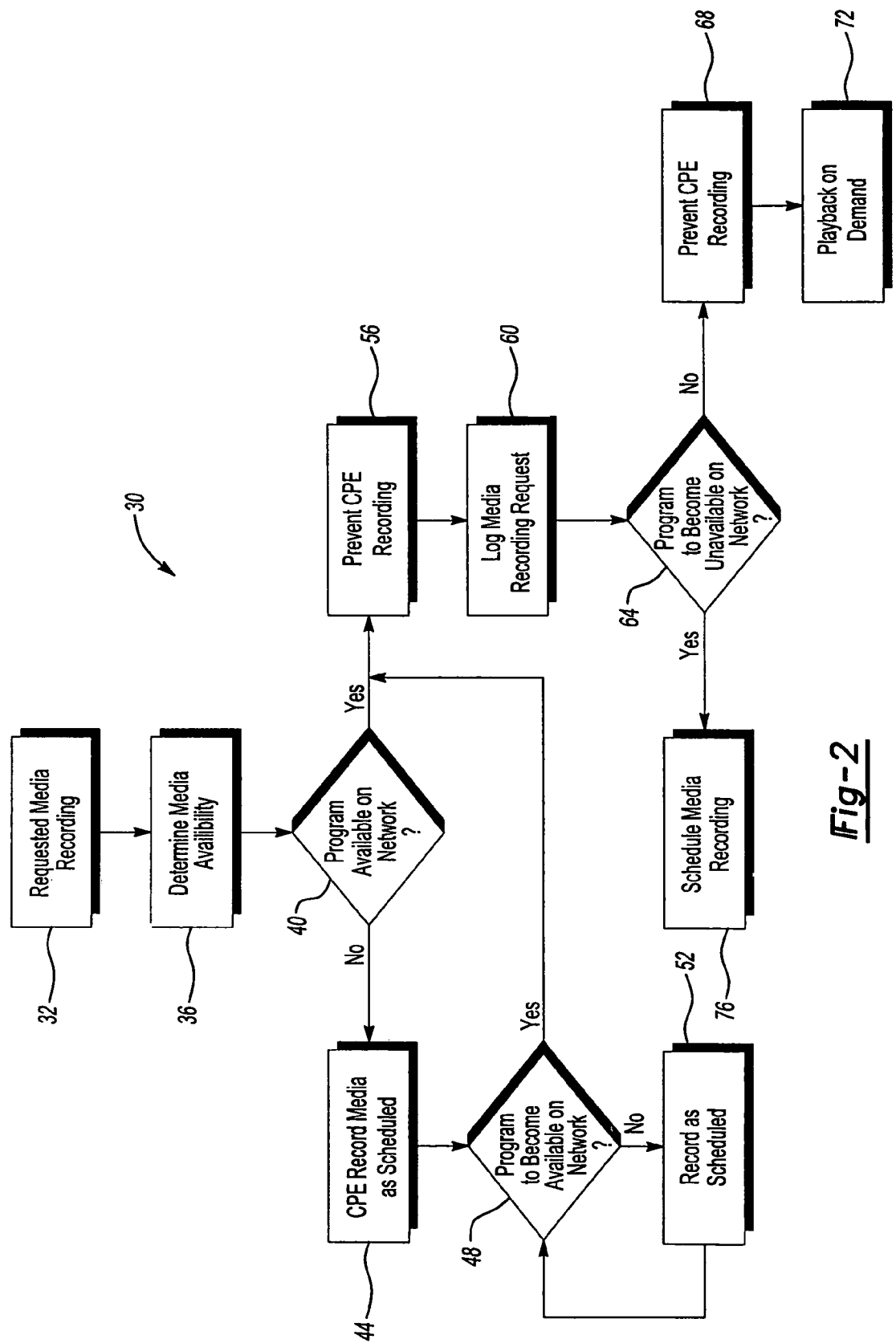
FIG. 2 illustrates a flowchart of a method of limiting recording demands of the CPE in accordance with one non-limiting aspect of the present invention.

FIG. 2 illustrates a flowchart 30 of a method of limiting recording demands of CPE in accordance with one non-limiting aspect of the present invention. The method generally relates to instructing or otherwise controlling operation of the CPE to record programs or other media content so as to limit memory consumption of the CPE or otherwise manage storage capacity. This may optionally include preventing recording to the CPE when the recorded media is available from another network resource.

Block 32 relates to determining a request to record media content. The request may be received by the CPE and communicated to a recording controller. The recording request generally relates to any desire of a user to record or otherwise store media content on the CPE for later viewing. The CPE and recording controller may be suitable configured to interrogate the recording request and to communicate with each other regarding the same. For example, if the CPE is a DVR, the request may be made through a user interface, menu, or other feature associated with operations of the DVR.

Block 36 relates to determining an availability of the requested media content. This may include the recording controller executing any number of operations to determine whether the media content is available from one or both of the media provider, from one or more of the other pieces of CPE in the system, and/or from some other source. The availability of the media content generally relates to whether the media content is available from a network resource. The network resource may related to the media provider, CPE, and/or other element in the system.

The network resources of interest may include those having capabilities to support transporting or otherwise delivering requested media to the CPE upon request. The network resources may be those having a capabilities to store media content, as opposed to broadcast sources and the like that merely transmit media on an on-going basis. The media provider, for example, my include a video on demand platform and/or a remote recording element for storing and transmitting media content upon request. Likewise, the other CPE, such as but not limited to those in a peer-to-peer relationship, may be similarly used for storing and transmitting media content upon request.

Block 40 relates to determining whether the requested media content is available and/or likely to be available in the future from network resources, such as but not limited to resources associated with the media provider, one or more of the other CPEs, and/or another resource in communication with the requesting CPE by way of the network. A media content identifier may be included within the media content request for use by the recording controller in accessing information associated with the availability thereof.

For example, the CPE and/or content provider may be configured to periodically provide an inventory of stored media content to the recording controller. The recording controller may cross-reference the received identifiers with the inventory information received from the content provider and the other pieces of CPE to facilitate determining whether the requested content is available from the network. This information may be periodically updated and tracked so as to provide a relatively quick method for assessing the availability of requested media.

The requested media may be determined to be available from the network if one or more of the network resources includes a copy of the media that can be played or otherwise retrieved for deliver to the requesting CPE when desired. The media provider may include a video on demand platform or other on demand or customer requestable system for transporting the requested content to the customer when needed. Likewise, the other pieces of CPE may include communication capabilities for transporting the media content to the requesting CPE.

Block 44 relates to the requested media being unavailable and recording the requested media content with the CPE as scheduled. This may include the CPE executing programmable operations to record the media content on a local harddrive, memory, or other storage device. For example, if the requested media content relates to a television program or movie scheduled to show at a particular time of day, the CPE may be instructed by the recording controller or through a local selection process to record the program at the scheduled time of day.

Block 48 relates to monitoring one or more scheduled CPE recordings to determine whether the previously unavailable media has become available on a network resource. For example, if a limited number of resources are requesting the media, the media provider may elect not store in the media content on a network recording element. However, if multiple requests are received for the same media content, the media provider may elect to store the media on the network recording element such that network availability of the media may change from being unavailable to becoming available. Similarly, if another piece of CPE records the requested media at some point after the media is requested and before it is stored, the requested media may now be available from the other CPE (network resource).

If the availability of the media has not changed, Block 52 is reached and the media is recorded as scheduled. Optionally, just prior to recording the media, the CPE may revert back to Block 48 in order to check for any last minute change in availability. This may be helpful if the CPE is unable to keep up with changes in availability and/or to limit the number of times availability must be checked. Rather, the continuously checking availability, the CPE may check availability just prior to occurrence of the recording event.

Block 56 relates to the requested media being available and preventing the requesting CPE from recording the requested media content. The recording controller may be configured to instruct the CPE not to record the media content if the media content is available or will be available from the network resources. For example, if the CPE is requesting recording of a television program at a particular time of day, the recording controller may instruct the CPE not to record the program if the program is available on demand from the content provider or one of the other pieces of CPE.

The ability to prevent local recording in favor of on demand availability, either from the content provider and/or one of the other CPEs, such as from another CPE scheduled to record the same program and/or another CPE that may have already recorded or otherwise obtained the requested media content, removes the need to store another copy of the program on the requesting CPE. This allows the capacity of the requesting CPE to be used to store additional media content.

Block 60 relates to logging the recording request. The log may be kept by the recording controller and used for determining whether the requested media content is no longer available and/or likely to become unavailable from the network. For example, if the customer request recording of a television program that is to be removed from the on demand platform of the media provider within the near future, the recording controller may be configured to facilitate transferring a copy thereof to the requesting CPE, in advance of the requested program being removed from the network.

Optionally, the CPE may be configured to periodically export a media content request log to the recording controller. The log may be used by the recording controller to periodically check whether the requested media content is to become unavailable from the network. Transporting the log to the recording controller rather than having the recording controller store the logs may ameliorate storage demands on the controller.

Block 64 relates to determining whether requested media content is to become unavailable from the network. The recording controller may be configured to receive deletion requested, program removal, or other instructions from the media provider and the CPE in a removal file. The removal file may be used to indicate media content that is to become unavailable from the network. The recording controller may then compare the requested media content logs provided by the CPE to the removal file to determine whether the media content is to become unavailable from the network.

Block 68 relates to preventing the CPE from recording the requested media content if the media is still believed to be available from the network. The recording controller may be configured to instruct the CPE not to record the media content as requested if the media content is available from the network at the request of the CPE. The recording prevention may be transparent or otherwise undetectable to the user. For example, the CPE interface associated with requesting the recording may show the requested media to be ready for immediate viewing even thought the media is not actually stored on the CPE.

Block 72 relates to playback of the media content when requested by the CPE. The playback may automatically occur upon request from the user in a transparent manner such that the user is unaware of whether the media is being source from a network resource or the CPE, i.e., the user is unaware of where the media resides. Optionally, the playback may include any number of transmission mechanisms and procedures suitable to facilitating playback. This may include providing DVR related controls (pause, rewind, fast forward, etc.) and any number of other controls that would otherwise be available if the media was stored locally on the CPE.

Block 76 relates to scheduling recording of the requested media content if the media content is to become unavailable from the network. This may include the media provider and/or CPE having a copy of the requested media content transported to the media content directly to the requesting CPE. This may be done in a point-to-point transfer and/or through a multi-cast or broadcast transfer, such as if multiple CPEs are requesting recording of the same program. Optionally, the recording and media content transferal may be scheduled for non-use or limited-use periods. For example, the source having the media content may be configured to transmit the requested media content at a time of day when bandwidth constraints are less and/or times of day when the receiving CPE is less likely to be in use.

Alternatively, the media provider may alter a program scheduling to transport the requested content through channels used for other broadcasts. In more detail, if the requested media content is related to a program of high demand such that multiple CPEs are requesting the same recording, to ameliorate multiple transports or other bandwidth consumption, the media provider may show the program at a non-scheduled time on a particular channel. The recording controller may instruct the correspond CPEs to record the program at the new time and channel.

The scheduled recording, whether the recording is associate with Block 52 or Block 72, may be override or limited as a function of recording privileges. The recording privileges may relate to rules or other parameters associated with the recording capabilities of the CPE. These privileges may be used to prioritize recording capabilities as the recording capacity of the CPE may be limited. For example, certain users may include rights above those of other users such that recording may be permitted or denied according to a hierarchal relationship of the users. Likewise, recording privileges may be dictate according to content, ratings, genres, and other parameters associated with the subject matter of the requested content such some subject matter is permitted for recording and other subject matter is denied.

As described above, the recording controller may be configured to determine the availability of the media content and to perform any number of operations as a function thereof. Of course, however, the present invention is not so limited and fully contemplates integrating any of the functions of the recording controller with the operation of the CPE or other element in the system. In particular, the present invention fully contemplates the CPE being configured to assess whether requested media content is available from the network and to perform any of the above-described operations as a function thereof.

In the case of DVRs, for example, storage capacity is finite and tends to consistently stay at 100% of capacity, with user preferences mandating what content may be deleted for future recordings. One aspect of the present invention involves intelligently integrating network resources and availability with local DVR resources to manage DVR storage capacities. For example, if a DVR has a set of series recording for a particular program, and that program is available through another network resource, such as from a video on demand platform of the content provider or from another piece of CPE, the CPE requesting recordation of that program may be instructed not to record the program and instructed instead to retrieve it from the network resource.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method, comprising:
   suppressing storage of a content item by a first content storage device responsive to a determination that the content item is scheduled for recording by a second content storage device; and
   responsive to a determination that the content item is to become unavailable from the second content storage device, broadcasting the content item to a plurality of content storage devices from a source different from the second content storage device.

2. A method, comprising:
   processing, by a processor of a first customer premises equipment (CPE) comprising a first local storage device, inventory information comprising a plurality of identifiers of content items associated with a second local storage device of a second customer premises equipment (CPE), wherein the second local storage device is different from the first local storage device;
   determining, based on processing the inventory information, that a content item which the first CPE is requested to locally record to the first local storage device is scheduled to be locally recorded by the second local storage device of the second CPE and is to be available from the second CPE via a network upon request;

preventing local recording of the content item to the first local storage device by the first CPE in response to the determining; and subsequent to preventing local recording of the content item to the first local storage device by the first CPE and responsive to determining by the first CPE that the content item is to become unavailable from the second CPE, recording, by the first CPE and to the first local storage device, a broadcast of the content to a plurality of CPEs from a source different from the second CPE, the broadcast of the content item being scheduled in response to the determining by the first CPE that the content item is to become unavailable from the second CPE.

3. The method of claim 2, further comprising:

retrieving the content item for playback in response to receiving a request for playback of the content item.

4. The method of claim 3, wherein the content item is retrieved from a video on demand (VOD) platform or the second CPE.

5. The method of claim 3, further comprising:

cross referencing the plurality of identifiers of content items associated with the second local storage device with a plurality of identifiers of content items associated with the first local storage device of the first CPE.

6. The method of claim 2, wherein the determining that the content item is to become unavailable comprises:

storing a requested media content log indicating that the content item has been requested;

processing a removal file received from the second CPE indicating that the second CPE is scheduled to remove the content item; and comparing the requested media content log to the removal file to determine that the content item is being removed and to initiate local recording of the content item by the first local storage device of the first CPE.

7. The method of claim 6, wherein the local recording of the content item occurs during a limited-use period of time.

8. The method of claim 6, further comprising, wherein prior to causing of the local recording, automatically launching, at the first CPE, playback of the content item from the second CPE.

9. The method of claim 6, further comprising overriding the local recording in response to determining that the requested content item is scheduled to be recorded by a third CPE.

10. A method, comprising:

determining, by a first customer premises equipment (CPE) device comprising a first local storage device, that media which the first CPE device is requested to locally record is scheduled to be locally recorded by a second CPE device and is to be available from the second CPE device via a network upon request;

preventing local recording of the media to the local storage device by the first CPE device; and subsequent to preventing local recording of the media to the local storage device by the first CPE device and responsive to determining that the media is to become unavailable from the second CPE device, recording, by the first CPE device to the local storage device, a broadcast of the media to a plurality of CPE devices from a source different from the second CPE device, wherein the media is broadcast by the source based at least in part on the media becoming unavailable from the second CPE device.

11. An apparatus, comprising:

at least one processor; and a memory storing instructions that when executed by the at least one processor cause the apparatus to:

determine that a content item requested for local recording to a first customer premises equipment (CPE) device is scheduled to be locally recorded by a second CPE device and is to be available from the second CPE device via a network;

prevent local recording of the content item to the first CPE device in response to the determining; and subsequent to preventing local recording of the content item to the first CPE device and responsive to determining that the content item is to become unavailable from the second CPE device, communicate, to the first CPE device, instructions to record a broadcast of the content item to a plurality of CPE devices from a source different from the second CPE device, the broadcast of the content item being scheduled in response to the content item becoming unavailable from the second CPE device.

12. The apparatus of claim 11, wherein the instructions, when executed by the at least one processor, cause the apparatus to:

retrieve the content item for playback from the second CPE device upon receiving a request for playback of the content item subsequent to the recording of the content item being prevented.

13. The apparatus of claim 11, wherein the instructions, when executed by the at least one processor, cause the apparatus to:

receive a plurality of identifiers of content items stored by the second CPE device and available for distribution.

14. The apparatus of claim 11, wherein the instructions, when executed by the at least one processor, cause the apparatus to:

override the local recording in response to determining that the requested content item is scheduled to become available from a network resource.

15. The apparatus of claim 11, wherein the instructions, when executed by the at least one processor, cause the apparatus to cross reference a plurality of identifiers of content items stored by the second CPE device with a plurality of identifiers of content items stored by the first CPE device.

16. The apparatus of claim 11, wherein the instructions, when executed by the at least one processor, cause the apparatus to update a requested media content log to indicate that the content item has been requested.

17. The apparatus of claim 16, wherein the instructions, when executed by the at least one processor, cause the apparatus to process a removal file, received from the second CPE device, that indicates that the second CPE device is scheduled to remove the content item.

18. The apparatus of claim 17, wherein the instructions, when executed by the at least one processor, cause the apparatus to compare the requested media content log to the removal file to determine that the content item is being removed and to initiate local recording of the content item.

19. The method of claim 2, wherein the content item is recorded by the first CPE to the first local storage device from a channel at a time, wherein the content item is scheduled to be broadcast on the channel at the time based at least in part on the content item becoming unavailable from the second CPE.

* * * * *

UNITED STATES PATENT AND TRADEMARK OFFICE
CERTIFICATE OF CORRECTION

Page 1 of 1

PATENT NO. : 8,839,319 B2
APPLICATION NO. : 11/646705
DATED : September 16, 2014
INVENTOR(S) : Derek T. Harrar et al.

It is certified that error appears in the above-identified patent and that said Letters Patent is hereby corrected as shown below:

Specification

Column 3, Detailed Description of the Preferred Embodiment(s), Line 17:
    Before "related", please insert --be--

Claims

Column 7, Claim 2, Line 9:
    After "content", insert --item--

Column 7, Claim 8, Line 38:
    After "comprising,", delete "wherein"

Column 7, Claim 10, Line 48:
    Before "local", delete "first"

Signed and Sealed this
Twentieth Day of October, 2015

Michelle K. Lee
*Director of the United States Patent and Trademark Office*